(12) United States Patent
Archer et al.

(10) Patent No.: US 9,495,135 B2
(45) Date of Patent: *Nov. 15, 2016

(54) DEVELOPING COLLECTIVE OPERATIONS FOR A PARALLEL COMPUTER

(75) Inventors: Charles J. Archer, Rochester, MN (US); James E. Carey, Rochester, MN (US); Philip J. Sanders, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/369,451

(22) Filed: Feb. 9, 2012

(65) Prior Publication Data

US 2013/0212558 A1    Aug. 15, 2013

(51) Int. Cl.
*G06F 9/44* (2006.01)
*G06F 9/54* (2006.01)

(52) U.S. Cl.
CPC ............... *G06F 8/34* (2013.01); *G06F 9/542* (2013.01)

(58) Field of Classification Search
CPC .............. G06F 8/30; G06F 8/34; G06F 8/38; G06F 8/20; G06F 9/4443
USPC ........................................................ 717/109
See application file for complete search history.

(56) References Cited

U.S. PATENT DOCUMENTS

| | | |
|---|---|---|
| 4,715,032 A | 12/1987 | Nilsson |
| 4,843,540 A | 6/1989 | Stolfo |
| 5,101,480 A | 3/1992 | Shin et al. |
| 5,105,424 A | 4/1992 | Flaig et al. |
| 5,333,279 A | 7/1994 | Dunning |
| 5,377,333 A | 12/1994 | Nakagoshi et al. |

(Continued)

FOREIGN PATENT DOCUMENTS

| | | |
|---|---|---|
| EP | 1835414 A2 | 9/2007 |
| JP | 2000156039 A | 6/2000 |

(Continued)

OTHER PUBLICATIONS

Keller, et al., "MPI Development Tools and Applications for the Grid," In Workshop on Grid Applications and Programming Tools (GGF8), Jun. 20, 2003, pp. 1-12, Seattle, USA.

(Continued)

*Primary Examiner* — Hang Pan
(74) *Attorney, Agent, or Firm* — Brandon C. Kennedy; Grant A. Johnson; Kennedy Lenart Spraggins LLP

(57) ABSTRACT

Developing collective operations for a parallel computer that includes compute nodes includes: presenting, by a collective development tool, a graphical user interface ('GUI') to a collective developer; receiving, by the collective development tool from the collective developer through the GUI, a selection of one or more collective primitives; receiving, by the collective development tool from the collective developer through the GUI, a specification of a serial order of the collective primitives and a specification of input and output buffers for each collective primitive; and generating, by the collective development tool in dependence upon the selection of collective primitives, the serial order of the collective primitives, and the input and output buffers for each collective primitive, executable code that carries out the collective operation specified by the collective primitives.

10 Claims, 7 Drawing Sheets

(56) References Cited

U.S. PATENT DOCUMENTS

| | | | |
|---|---|---|---|
| 5,513,371 A | 4/1996 | Cypher et al. | |
| 5,535,197 A | 7/1996 | Cotton | |
| 5,541,914 A | 7/1996 | Krishnamoorthy et al. | |
| 5,590,334 A | 12/1996 | Saulpaugh et al. | |
| 5,617,538 A | 4/1997 | Heller | |
| 5,668,815 A | 9/1997 | Gittinger et al. | |
| 5,721,828 A | 2/1998 | Frisch | |
| 5,737,628 A | 4/1998 | Birrittella et al. | |
| 5,805,589 A | 9/1998 | Hochschild et al. | |
| 5,822,604 A | 10/1998 | Ogasawara et al. | |
| 5,822,605 A | 10/1998 | Higuchi et al. | |
| 5,826,049 A | 10/1998 | Ogata et al. | |
| 5,832,215 A | 11/1998 | Kato et al. | |
| 5,864,712 A | 1/1999 | Carmichael et al. | |
| 5,875,329 A | 2/1999 | Shan | |
| 5,878,241 A | 3/1999 | Wilkinson et al. | |
| 5,892,923 A | 4/1999 | Yasuda et al. | |
| 5,937,202 A | 8/1999 | Crosetto | |
| 5,949,988 A | 9/1999 | Feisullin et al. | |
| 5,958,017 A | 9/1999 | Scott et al. | |
| 6,000,024 A | 12/1999 | Maddox | |
| 6,038,651 A | 3/2000 | VanHuben et al. | |
| 6,067,609 A | 5/2000 | Meeker et al. | |
| 6,076,131 A | 6/2000 | Nugent | |
| 6,108,692 A | 8/2000 | Van Seters et al. | |
| 6,167,502 A | 12/2000 | Pechanek et al. | |
| 6,212,617 B1 | 4/2001 | Hardwick | |
| 6,230,252 B1 | 5/2001 | Passint et al. | |
| 6,272,548 B1 | 8/2001 | Cotter et al. | |
| 6,289,424 B1 | 9/2001 | Stevens | |
| 6,292,822 B1 | 9/2001 | Hardwick | |
| 6,334,138 B1 | 12/2001 | Kureya | |
| 6,378,029 B1 | 4/2002 | Venkitakrishnan et al. | |
| 6,449,667 B1 | 9/2002 | Ganmukhi et al. | |
| 6,473,849 B1 | 10/2002 | Keller et al. | |
| 6,480,885 B1 | 11/2002 | Olivier | |
| 6,480,918 B1 | 11/2002 | McKenney et al. | |
| 6,647,438 B1 | 11/2003 | Connor et al. | |
| 6,691,101 B2 | 2/2004 | MacNicol et al. | |
| 6,714,552 B1 | 3/2004 | Cotter | |
| 6,742,063 B1 | 5/2004 | Hellum et al. | |
| 6,748,451 B2 | 6/2004 | Woods et al. | |
| 6,754,211 B1 | 6/2004 | Brown | |
| 6,834,301 B1 | 12/2004 | Hanchett | |
| 6,914,606 B2 | 7/2005 | Amemiya et al. | |
| 6,954,806 B2 | 10/2005 | Yosimoto et al. | |
| 6,982,960 B2 | 1/2006 | Lee et al. | |
| 7,010,576 B2 | 3/2006 | Bae | |
| 7,073,043 B2 | 7/2006 | Arimilli et al. | |
| 7,133,359 B2 | 11/2006 | Weis | |
| 7,143,392 B2 | 11/2006 | Li et al. | |
| 7,171,484 B1 | 1/2007 | Krause et al. | |
| 7,197,624 B2 | 3/2007 | Pechanek et al. | |
| 7,203,743 B2 | 4/2007 | Shah-Heydari | |
| 7,263,698 B2 | 8/2007 | Wildhagen et al. | |
| 7,284,033 B2 | 10/2007 | Jhani | |
| 7,352,739 B1 | 4/2008 | Rangarajan et al. | |
| 7,363,474 B2 | 4/2008 | Rodgers et al. | |
| 7,487,501 B2 | 2/2009 | Silvera et al. | |
| 7,496,699 B2 | 2/2009 | Pope et al. | |
| 7,499,468 B2 | 3/2009 | Montgomery, Jr. | |
| 7,509,244 B1* | 3/2009 | Shakeri et al. | 703/7 |
| 7,539,989 B2 | 5/2009 | Blackmore et al. | |
| 7,555,566 B2 | 6/2009 | Blumrich et al. | |
| 7,571,439 B1 | 8/2009 | Rabinovici et al. | |
| 7,587,516 B2 | 9/2009 | Bhanot et al. | |
| 7,590,983 B2 | 9/2009 | Neiman et al. | |
| 7,600,095 B2 | 10/2009 | Archer et al. | |
| 7,613,134 B2 | 11/2009 | Rangarajan et al. | |
| 7,640,315 B1 | 12/2009 | Meyer et al. | |
| 7,646,721 B2 | 1/2010 | Archer et al. | |
| 7,664,110 B1 | 2/2010 | Lovett et al. | |
| 7,673,011 B2 | 3/2010 | Archer et al. | |
| 7,697,443 B2 | 4/2010 | Archer et al. | |
| 7,707,366 B2 | 4/2010 | Tagawa | |
| 7,725,329 B2 | 5/2010 | Kil et al. | |
| 7,739,451 B1 | 6/2010 | Wiedenman et al. | |
| 7,774,448 B2 | 8/2010 | Shah-Heydari | |
| 7,796,527 B2 | 9/2010 | Archer et al. | |
| 7,808,930 B2 | 10/2010 | Boers et al. | |
| 7,835,378 B2 | 11/2010 | Wijnands et al. | |
| 7,853,639 B2 | 12/2010 | Archer et al. | |
| 7,856,543 B2 | 12/2010 | Rhoades et al. | |
| 7,936,681 B2 | 5/2011 | Gong et al. | |
| 7,948,999 B2 | 5/2011 | Blocksome et al. | |
| 7,974,221 B2 | 7/2011 | Tamassia et al. | |
| 7,984,448 B2* | 7/2011 | Almasi et al. | 719/313 |
| 7,991,857 B2* | 8/2011 | Berg et al. | 709/220 |
| 8,090,797 B2 | 1/2012 | Chinta et al. | |
| 8,131,825 B2 | 3/2012 | Nord et al. | |
| 8,136,104 B2* | 3/2012 | Papakipos et al. | 717/146 |
| 8,161,268 B2 | 4/2012 | Faraj | |
| 8,161,480 B2 | 4/2012 | Archer et al. | |
| 8,326,943 B2 | 12/2012 | Chinta et al. | |
| 8,365,186 B2 | 1/2013 | Faraj et al. | |
| 8,436,720 B2 | 5/2013 | Archer et al. | |
| 8,565,089 B2 | 10/2013 | Archer et al. | |
| 2001/0005873 A1 | 6/2001 | Yasuda et al. | |
| 2002/0016901 A1 | 2/2002 | Carvey et al. | |
| 2002/0054051 A1 | 5/2002 | Ladd | |
| 2002/0065984 A1 | 5/2002 | Thompson et al. | |
| 2002/0091819 A1 | 7/2002 | Melchione et al. | |
| 2002/0144027 A1 | 10/2002 | Schmisseur | |
| 2003/0041173 A1 | 2/2003 | Hoyle | |
| 2003/0182376 A1 | 9/2003 | Smith | |
| 2003/0188054 A1 | 10/2003 | Yosimoto et al. | |
| 2003/0212877 A1 | 11/2003 | Dally et al. | |
| 2003/0225852 A1 | 12/2003 | Bae | |
| 2004/0034678 A1 | 2/2004 | Kuszmaul et al. | |
| 2004/0073590 A1 | 4/2004 | Bhanot et al. | |
| 2004/0073755 A1 | 4/2004 | Webb et al. | |
| 2004/0107387 A1 | 6/2004 | Larsson et al. | |
| 2004/0168151 A1* | 8/2004 | Elteto | G06F 21/121 717/120 |
| 2005/0094577 A1 | 5/2005 | Ashwood-Smith | |
| 2005/0135395 A1 | 6/2005 | Fan et al. | |
| 2005/0165980 A1 | 7/2005 | Clayton et al. | |
| 2005/0243711 A1 | 11/2005 | Alicherry et al. | |
| 2006/0156312 A1 | 7/2006 | Supalov | |
| 2006/0168359 A1 | 7/2006 | Bissessur et al. | |
| 2006/0179181 A1 | 8/2006 | Seong | |
| 2006/0182137 A1 | 8/2006 | Zhou et al. | |
| 2006/0277323 A1 | 12/2006 | Joublin et al. | |
| 2006/0282838 A1* | 12/2006 | Gupta et al. | 719/313 |
| 2007/0011408 A1 | 1/2007 | Shen et al. | |
| 2007/0016905 A1 | 1/2007 | Rector | |
| 2007/0081516 A1 | 4/2007 | Arimilli et al. | |
| 2007/0110063 A1 | 5/2007 | Tang et al. | |
| 2007/0174558 A1 | 7/2007 | Jia et al. | |
| 2007/0226686 A1 | 9/2007 | Beardslee et al. | |
| 2007/0242609 A1 | 10/2007 | Archer et al. | |
| 2007/0242611 A1 | 10/2007 | Archer et al. | |
| 2007/0242685 A1 | 10/2007 | Archer et al. | |
| 2007/0245122 A1 | 10/2007 | Archer et al. | |
| 2007/0245163 A1 | 10/2007 | Lu et al. | |
| 2007/0260909 A1 | 11/2007 | Archer et al. | |
| 2007/0277056 A1 | 11/2007 | Varadarajan | |
| 2007/0288935 A1 | 12/2007 | Tannenbaum et al. | |
| 2007/0294666 A1* | 12/2007 | Papakipos et al. | 717/119 |
| 2007/0294681 A1* | 12/2007 | Tuck et al. | 717/149 |
| 2008/0022079 A1 | 1/2008 | Archer et al. | |
| 2008/0077366 A1 | 3/2008 | Neuse et al. | |
| 2008/0101232 A1 | 5/2008 | Archer et al. | |
| 2008/0109569 A1 | 5/2008 | Leonard et al. | |
| 2008/0127146 A1 | 5/2008 | Wildhagen et al. | |
| 2008/0155249 A1 | 6/2008 | Backof et al. | |
| 2008/0177505 A1 | 7/2008 | Volponi | |
| 2008/0201603 A1 | 8/2008 | Ritz et al. | |
| 2008/0229059 A1 | 9/2008 | May | |
| 2008/0250325 A1 | 10/2008 | Feigenbaum et al. | |
| 2008/0263320 A1 | 10/2008 | Archer et al. | |
| 2008/0263329 A1 | 10/2008 | Archer et al. | |
| 2008/0270563 A1* | 10/2008 | Blocksome et al. | 709/212 |
| 2008/0273543 A1 | 11/2008 | Blocksome et al. | |

(56) References Cited

U.S. PATENT DOCUMENTS

| | | |
|---|---|---|
| 2008/0288949 A1 | 11/2008 | Bohra et al. |
| 2008/0301683 A1 | 12/2008 | Archer et al. |
| 2008/0313661 A1 | 12/2008 | Blocksome et al. |
| 2009/0006662 A1 | 1/2009 | Chen et al. |
| 2009/0006663 A1 | 1/2009 | Archer et al. |
| 2009/0006808 A1 | 1/2009 | Blumrich et al. |
| 2009/0019218 A1 | 1/2009 | Sinclair et al. |
| 2009/0019258 A1 | 1/2009 | Shi |
| 2009/0037377 A1 | 2/2009 | Archer et al. |
| 2009/0037511 A1 | 2/2009 | Almasi et al. |
| 2009/0037707 A1 | 2/2009 | Blocksome |
| 2009/0040946 A1 | 2/2009 | Archer et al. |
| 2009/0043910 A1 | 2/2009 | Barsness et al. |
| 2009/0052462 A1 | 2/2009 | Archer et al. |
| 2009/0055474 A1 | 2/2009 | Archer et al. |
| 2009/0063815 A1 | 3/2009 | Arimilli et al. |
| 2009/0064140 A1 | 3/2009 | Arimilli et al. |
| 2009/0064149 A1 | 3/2009 | Singh et al. |
| 2009/0064176 A1 | 3/2009 | Ohly et al. |
| 2009/0067334 A1 | 3/2009 | Archer et al. |
| 2009/0089512 A1 | 4/2009 | Shen et al. |
| 2009/0113308 A1 | 4/2009 | Almasi et al. |
| 2009/0154486 A1 | 6/2009 | Archer et al. |
| 2009/0196361 A1 | 8/2009 | Chan et al. |
| 2009/0240838 A1 | 9/2009 | Berg et al. |
| 2009/0240915 A1 | 9/2009 | Faraj et al. |
| 2009/0245134 A1 | 10/2009 | Archer et al. |
| 2009/0248712 A1 | 10/2009 | Yuan |
| 2009/0259713 A1 | 10/2009 | Blumrich et al. |
| 2009/0292905 A1 | 11/2009 | Faraj |
| 2009/0307467 A1 | 12/2009 | Faraj |
| 2009/0310544 A1 | 12/2009 | Jain et al. |
| 2009/0319621 A1 | 12/2009 | Barsness et al. |
| 2010/0017420 A1 | 1/2010 | Archer et al. |
| 2010/0023631 A1 | 1/2010 | Archer et al. |
| 2010/0057738 A1 | 3/2010 | Ianni |
| 2010/0066749 A1* | 3/2010 | Mihara ............ H04N 1/32144 345/522 |
| 2010/0082788 A1 | 4/2010 | Mundy |
| 2010/0122268 A1 | 5/2010 | Jia |
| 2010/0185718 A1 | 7/2010 | Archer et al. |
| 2010/0191911 A1 | 7/2010 | Heddes et al. |
| 2010/0274997 A1 | 10/2010 | Archer et al. |
| 2011/0010471 A1 | 1/2011 | Heidelberger et al. |
| 2011/0078692 A1 | 3/2011 | Nickolls et al. |
| 2011/0119673 A1* | 5/2011 | Bloch et al. .................. 718/102 |
| 2011/0125974 A1 | 5/2011 | Anderson |
| 2011/0153908 A1 | 6/2011 | Schaefer et al. |
| 2011/0179134 A1 | 7/2011 | Mayo et al. |
| 2011/0238950 A1 | 9/2011 | Archer et al. |
| 2011/0258245 A1 | 10/2011 | Blocksome et al. |
| 2011/0258627 A1* | 10/2011 | Faraj et al. .................. 718/100 |
| 2011/0267197 A1 | 11/2011 | Archer et al. |
| 2011/0270986 A1 | 11/2011 | Archer et al. |
| 2011/0289177 A1 | 11/2011 | Archer et al. |
| 2011/0296137 A1 | 12/2011 | Archer et al. |
| 2011/0296139 A1 | 12/2011 | Archer et al. |
| 2012/0066284 A1 | 3/2012 | Archer et al. |
| 2012/0117361 A1 | 5/2012 | Archer et al. |
| 2012/0179881 A1 | 7/2012 | Archer et al. |
| 2012/0197882 A1 | 8/2012 | Jensen |
| 2012/0216021 A1 | 8/2012 | Archer et al. |
| 2012/0317399 A1 | 12/2012 | Blocksome et al. |
| 2012/0331270 A1 | 12/2012 | Archer et al. |
| 2013/0042088 A1 | 2/2013 | Archer et al. |
| 2013/0042245 A1 | 2/2013 | Archer et al. |
| 2013/0042254 A1 | 2/2013 | Archer et al. |
| 2013/0067198 A1 | 3/2013 | Archer et al. |
| 2013/0073603 A1 | 3/2013 | Archer et al. |
| 2013/0073832 A1 | 3/2013 | Archer et al. |
| 2013/0074098 A1 | 3/2013 | Archer et al. |
| 2013/0080563 A1 | 3/2013 | Archer et al. |
| 2013/0086358 A1 | 4/2013 | Archer et al. |
| 2013/0111496 A1 | 5/2013 | Archer et al. |
| 2013/0151713 A1 | 6/2013 | Faraj |
| 2013/0173675 A1 | 7/2013 | Archer et al. |
| 2013/0212145 A1 | 8/2013 | Archer et al. |
| 2013/0212558 A1 | 8/2013 | Archer et al. |
| 2013/0212561 A1 | 8/2013 | Archer et al. |
| 2013/0246533 A1 | 9/2013 | Archer et al. |
| 2013/0290673 A1 | 10/2013 | Archer et al. |

FOREIGN PATENT DOCUMENTS

| | | |
|---|---|---|
| JP | 2003036681 A | 2/2003 |
| JP | 2003317487 A | 11/2003 |
| WO | WO 2007/057281 A1 | 5/2007 |

OTHER PUBLICATIONS

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. No. 60/271,124, filed Feb. 24, 2001, pp. 12-13, 27 and 42-43.

Office Action Dated Mar. 4, 2008 in U.S. Appl. No. 11/279,620.

Office Action Dated Sep. 3, 2008 in U.S. Appl. No. 11/279,620.

Office Action Dated Dec. 29, 2008 in U.S. Appl. No. 11/279,620.

Office Action Dated Apr. 3, 2009 in U.S. Appl. No. 11/769,367.

Office Action Dated Dec. 13, 2007 in U.S. Appl. No. 11/459,387.

Office Action Dated Jul. 11, 2008 in U.S. Appl. No. 11/459,387.

Office Action Dated Mar. 18, 2009 in U.S. Appl. No. 11/459,387.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

Notice of Allowance, U.S. Appl. No. 12/124,745, Mar. 6, 2013.

Final Office Action, U.S. Appl. No. 12/770,286, Jan. 29, 2013.

Final Office Action, U.S. Appl. No. 12/748,594, Mar. 22, 2013.

Notice of Allowance, U.S. Appl. No. 12/790,037, Mar. 15, 2013.

Final Office Action, U.S. Appl. No. 13/459,832, Jan. 4, 2013.

Notice of Allowance, U.S. Appl. No. 13/585,993, Jan. 31, 2013.

Office Action, U.S. Appl. No. 13/672,740, Apr. 2, 2013.

Office Action, U.S. Appl. No. 13/166,183, Feb. 24, 2014, pp. 1-22.

Office Action, U.S. Appl. No. 13/206,116, Feb. 7, 2014, pp. 1-32.

Keller, R., et al., "MPI Development Tools and Applications for the Grid", In Workshop on Grid Applications and Programming Tools, Jun. 20, 2003, pp. 1-12, Innovative Computing Laboratory, Computer Science Department, University of Tennessee, Knoxville, TN, USA.

Edmonds et al., "AM++: A Generalized Active Message Framework", The 19th International Conference on Parallel Architectures and Compilation Techniques (PACT'10), Sep. 11-15, 2010, pp. 1-10, ACM, New York, NY USA. ISBN: 978-1-4503-0178-7.

Bangalore et al., "Extending the Message Passing Interface (MPI)", Proceedings of the 1994 Conference on Scalable Parallel Libraries, Oct. 12-14, 1994, pp. 106-118, IEEE Computer Society Press, USA. IEEE Digital Object Identifier: 10.1109/SPLC.1994.376998.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, A., et al., "Computing The Hough Transform on a Scan Line Array Processor [image processing]", IEEE Transactions on Pattern Analysis and Machine Intelligence, vol. 11, Issue: 3, Mar. 1989, pp. 262-65, IEEE Xplore.

(56) References Cited

OTHER PUBLICATIONS

Kodama, Y., et al., "Efficient MPI Collective Operations for Clusters in Long-and-Fast Networks", pp. 1-9, 2006 IEEE International Conference on Cluster Computing, Sep. 2006, IEEE.

Shaw, D., et al., DADO: A Tree-Structured Machine Architecture for Production Systems, AAAI-82 Proceedings, Month: Unknown, Year: 1982, AAAI (www.aaai.org), pp. 242-46, Columbia University.

Choi, H., et al., "An All-Reduce Operation in Star Networks Using All-to-All Broadcast Communication Patterns", V.S. Sunderam et al. (Eds.): ICCS 2005, LNCS 3514, pp. 419-426, 2005, Springer-Verlag Berlin Heidelberg 2005.

Patarasuk, P., et al., "Bandwidth Efficient All-reduce Operation on Tree Topologies", IEEE IPDPS Workshop on High-Level Parallel Programming Models and Supportive Environments, 2007, pp. 1-8, IEEE.

Better Explained, "Swap two variables using XOR I BetterExplained", http://betterexplained.com/articles/swap-two-variables-using-xor, Accessed Jun. 4, 2011, pp. 1-8.

Bafna, R., et al, "Coprocessor Design to Support MPI Primitives in Configurable Mutliprocessors", Integration, the VLSI Journal, Volume: 40, Issue: 3, pp. 235-52, Apr. 2007, Elsevier, URL: http://web.njit.edu/~ziavras/INTEGRATION-1.pdf.

Tang, H., et al., "Optimizing Threaded MPI Execution on SMP Clusters," ICS '01 Proceedings of the 15th International Conference on Supercomputing, Jun. 2001, pp. 381-92, ACM, New York, USA.

Faraj, A., et al. "Automatic Generation and Tuning of MPI Collective Communication Routines", ICS' 05, Jun. 20-22, Boston, MA, USA. pp. 393-402, ACM.

Shrimali, G., et al., "Building Packet Buffers Using Interleaved Memories", (Proc. Sixth Workshop High Performance Switching and Routing (HPSR '05), May 2005, pp. 1-5, IEEE.

Ong, H., et al., "Kernel-level Single System Image for Petascale Computing", SIGOPS Oper. Syst. Rev., Apr. 2006, pp. 50-54, vol. 40, No. 2, ACM, New York, NY, USA.

Foster, I., et al., "Message Passing and Threads," Sourcebook of Parallel Computing, (Month Unknown) 2003, pp. 301-17, Morgan Kaufmann Publishers Inc. URL: http://web.eecs.utk.edu/~dongarra/WEB-PAGES/SPRING-2006/chapter10.pdf.

Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.

Message Passing Interface Forum,"MPI: A Message-Passing Interface Standard Version 2.2", MPI Specification, Sep. 4, 2009, pp. 1-647, High Performance Computing Center Stuttgart (HLRS).

Vetter, J., et al., "Real-Time Performance Monitoring, Adaptive Control, and Interactive Steering of Computational Grids", International Journal of High Performance Computing Applications Winter 2000, pp. 357-366 (10 Pages), vol. 14, No. 4, Sage Publications, Inc. Thousand Oaks, CA, USA.

Wikipedia, "Cache (computing)—Wikipedia, the free encyclopedia", Cache (computing), Edited by EmausBot, Jul. 22, 2011, Accessed Aug. 10, 2013, 6 Pages.

Wikipedia, "Fuzzy logic—Wikipedia, the free encyclopedia", Fuzzy Logic, Edited by Jeff Silvers, Aug. 1, 2011, Accessed Aug. 10, 2013, 10 Pages.

Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.

Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.

Tanenbaum, A., "Structured Computer Organization", Jan. 1984, pp. 1-5, Second Edition, Prentice-Hall, Inc., Englewood Cliffs, NJ, USA, ISBN: 0-13-854489-1.

Shaw, D., et al., DADO: A Tree-Structured Machine Architecture for Production Systems, AAAI-82 Proceedings, Jan. 1982, AAAI (www.aaai.org), pp. 242-46, AAAI Press.

Rosenberg, J., "Dictionary of Computers, Information Processing & Telecommunications", Sep. 1987, pp. 1-5, Second Edition, John Wiley & Sons, New York, NY, USA.

Office Action, U.S. Appl. No. 13/665,985, Apr. 25, 2014, pp. 1-19. The Trustees of Indiana University and Indiana University Research and Technology Corporation et al., "openmpi", opensource.apple.com (online), accessed Sep. 5, 2012, pp. 1-3, URL: http://www.opensource.apple.com/source/openmpi/openmpi-8/openmpi/ompi/mca/coll/basic/coll_basic_scatterv.c.

Tu et al., "Performance analysis and optimization of MPI collective operations on multi-core clusters", springer.com (online), Apr. 22, 2009, pp. 1-22, Springer Science+Business Media, LLC, New York, NY.

Neeman et al., "Collective Operations with MPI", OU Supercomputing Symposium Workshop, Oct. 2009, pp. 1-12, University of Oklahoma, Norman, OK.

* cited by examiner

DEVELOPING COLLECTIVE OPERATIONS FOR A PARALLEL COMPUTER

BACKGROUND OF THE INVENTION

1. Field of the Invention

The field of the invention is data processing, or, more specifically, methods, apparatus, and products for developing collective operations for a parallel computer that includes a number of compute nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

SUMMARY OF THE INVENTION

Methods, apparatus, and products for developing collective operations for a parallel computer comprising a plurality of compute nodes are disclosed in this specification. Developing such collective operations in accordance with embodiments of the present invention includes: presenting, by a collective development tool, a graphical user interface ('GUI') to a collective developer; receiving, by the collective development tool from the collective developer through the GUI, a selection of one or more collective primitives; receiving, by the collective development tool from the collective developer through the GUI, a specification of a serial order of the collective primitives and a specification of input and output buffers for each collective primitive; and generating, by the collective development tool in dependence upon the selection of collective primitives, the serial order of the collective primitives, and the input and output buffers for each collective primitive, executable code that carries out the collective operation specified by the collective primitives.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
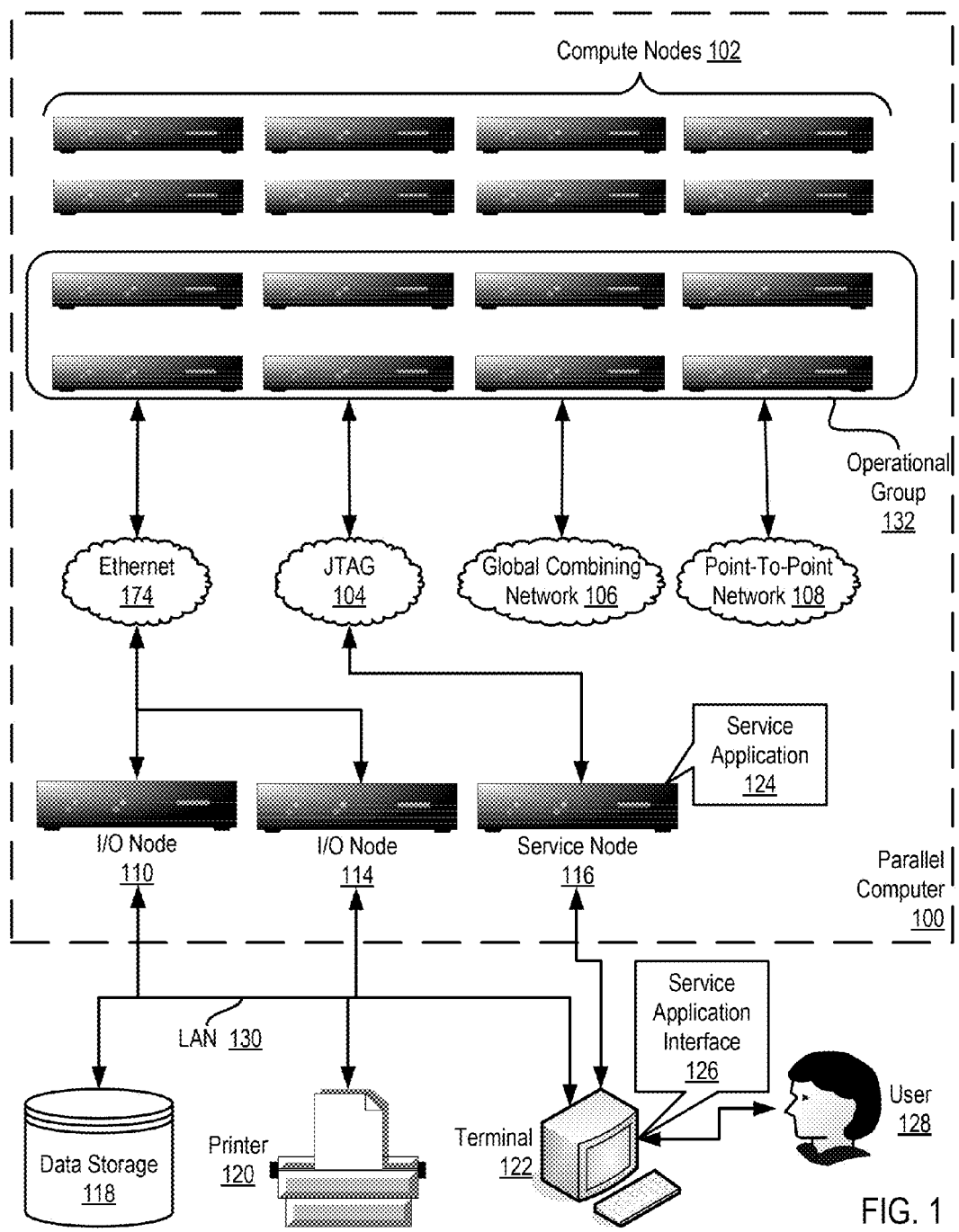
FIG. 1 illustrates an exemplary system for developing collective operations for a parallel computer according to embodiments of the present invention.

Exemplary methods, apparatus, and products for developing collective operations for a parallel computer in accordance with the present invention are described with reference to the accompanying drawings, beginning with FIG. 1. FIG. 1 illustrates an exemplary system for which collective operations may be developed and within which collective operation may be developed according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 supports collective operations developed in accordance with embodiments of the present invention. Such operations may be developed on a compute node (102) of the parallel computer (100) itself or on other automated computing machinery. Developing collective operations in accordance with embodiments of the present invention includes: presenting, by a collective development tool, a graphical user interface ('GUI') to a collective developer. The term collective developer is used in this specification to refer to a user (128) that develops software executable on a parallel computer that carries out collective operations. A collective development tool is a module of computer program instructions that, when executed, cause automated computing machinery comprising an aggregation of computer hardware and software to carry out collective development in accordance with embodiments of the present invention.

The collective development tool also receives, from the collective developer through the GUI, a selection of one or more collective primitives. A collective primitive is a module of computer program instructions that, when executed, carries out a predefined collective task. Each primitive is a building block that may be combined with other primitives in various ways to form a complex collective operation. Examples of such collective primitives include:

a multi-sync primitive that, when executed, carriers out synchronization among a plurality of compute nodes;
 a multi-cast primitive that, when executed, sends a message to a group of nodes in parallel;
 a multi-combine primitive that, when executed, performs an operation on data received from more than one compute node; and
 a many-to-many primitive that, when executed, sends unique date to a group of compute nodes and receives data from another group of compute nodes.

The collective development tool, after receiving a specification of one or more collective primitives, also receives, from the collective developer through the GUI, a specification of a serial order of the collective primitives and a specification of input and output buffers for each collective primitive. The order of the collective primitives specifies an order of execution of the collective primitives, one following another. The specification of the input and output buffers may be implemented in various ways, including, for example, as a definition of a global variable or pointer representing an array of a particular size.

The collective development tool then generates executable code that carries out the collective operation specified by the collective primitives in dependence upon the selection of collective primitives, the serial order of the collective primitives, and the input and output buffers for each collective primitive.

The collective development tool enables a collective developer to develop a collective operation in a graphical interface rather than through tedious composition of source code. In this way, complex collective operations may be 'built' by a developer quickly and efficiently without requiring the developer to compose every computer program instructions that will be executed to effect the collective operation.

Developing collective operations for a parallel computer according to embodiments of the present invention is generally implemented for a parallel computer that includes a plurality of compute nodes organized for collective operations through at least one data communications network. Further, developing collective operations for a parallel computer may also be carried in such a parallel computer. In fact, such computers may include thousands of compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of developing collective operations according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) of the compute node (102) is a collective development tool (228), a module of computer program instructions that, when executed, cause the compute node (102) to support collective operations development in accordance with embodiments of the present invention. Readers of skill in the art will recognize the collective development tool (228) of FIG. 2 executes on a compute node for purposes of explanation only, not limitation. Collective development tools configured in accordance with embodiments of the present invention may execute on any automated computing machinery.

Figure 2:
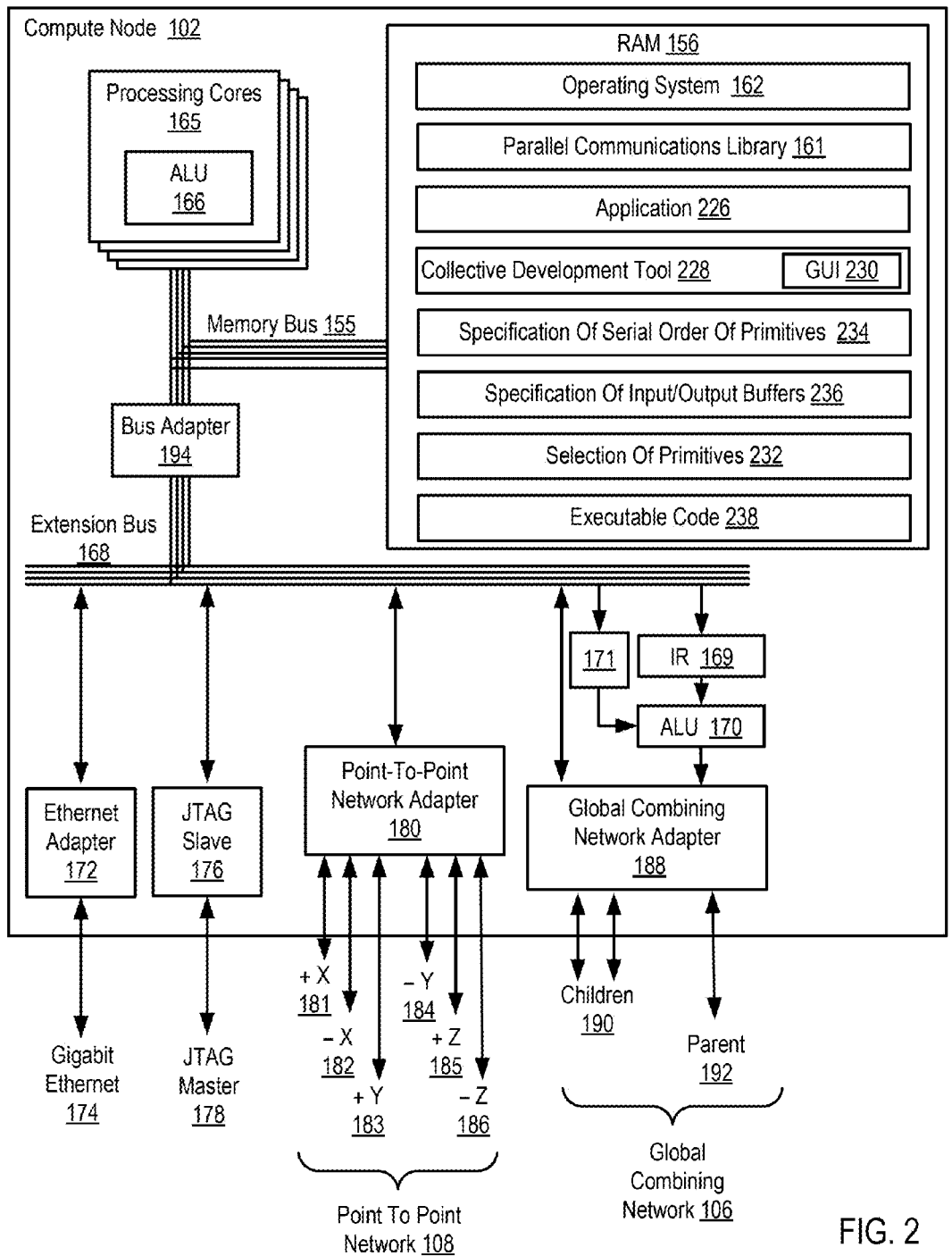
FIG. 2 sets forth a block diagram of an example compute node useful in a parallel computer configured for developing collective operations according to embodiments of the present invention.

The collective development tool (228) of FIG. 2 supports collective operation development in accordance with embodiments of the present invention by: presenting a GUI (230) to a collective developer; receiving, from the collective developer through the GUI (230), a selection (232) of one or more collective primitives; receiving, from the collective developer through the GUI (230), a specification (234) of a serial order of the collective primitives and a specification (236) of input and output buffers for each collective primitive; and generating executable code (238) that carries out the collective operation specified by the collective primitives in dependence upon the selection (232) of collective primitives, the serial order (234) of the collective primitives, and the input and output buffers (236) for each collective primitive. In some example embodiments, the executable code (238) may be a included as a library function in a parallel communications library (161), as a module of a parallel application (226), or in other ways as will occur to readers of skill in the art.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus in a parallel computer for which collective operations are developed in accordance with embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for which collective operations are developed in accordance with embodiments of the present invention to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
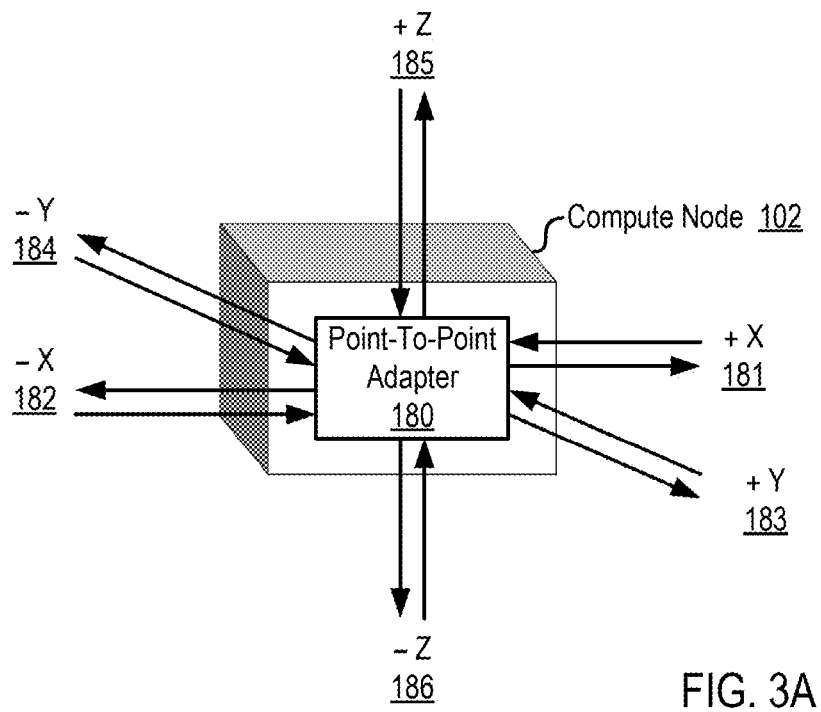
FIG. 3A sets forth a block diagram of an example Point-To-Point Adapter useful in systems for developing collective operations for a parallel computer according to embodiments of the present invention.

For further explanation, FIG. 3A sets forth a block diagram of an example Point-To-Point Adapter (180) useful in systems for which collective operations are developed in accordance with embodiments of the present invention according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
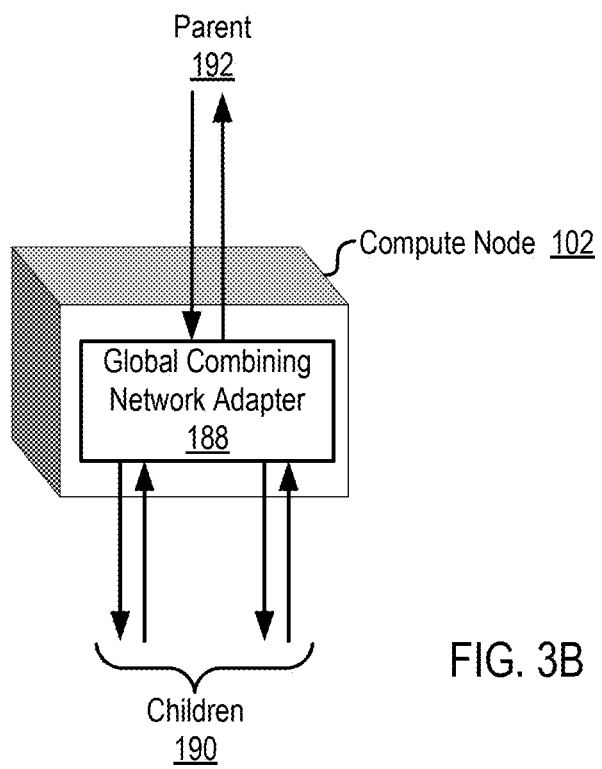
FIG. 3B sets forth a block diagram of an example Global Combining Network Adapter useful in systems for developing collective operations for a parallel computer according to embodiments of the present invention.

For further explanation, FIG. 3B sets forth a block diagram of an example Global Combining Network Adapter (188) useful in systems for [for which collective operations are developed in accordance with embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
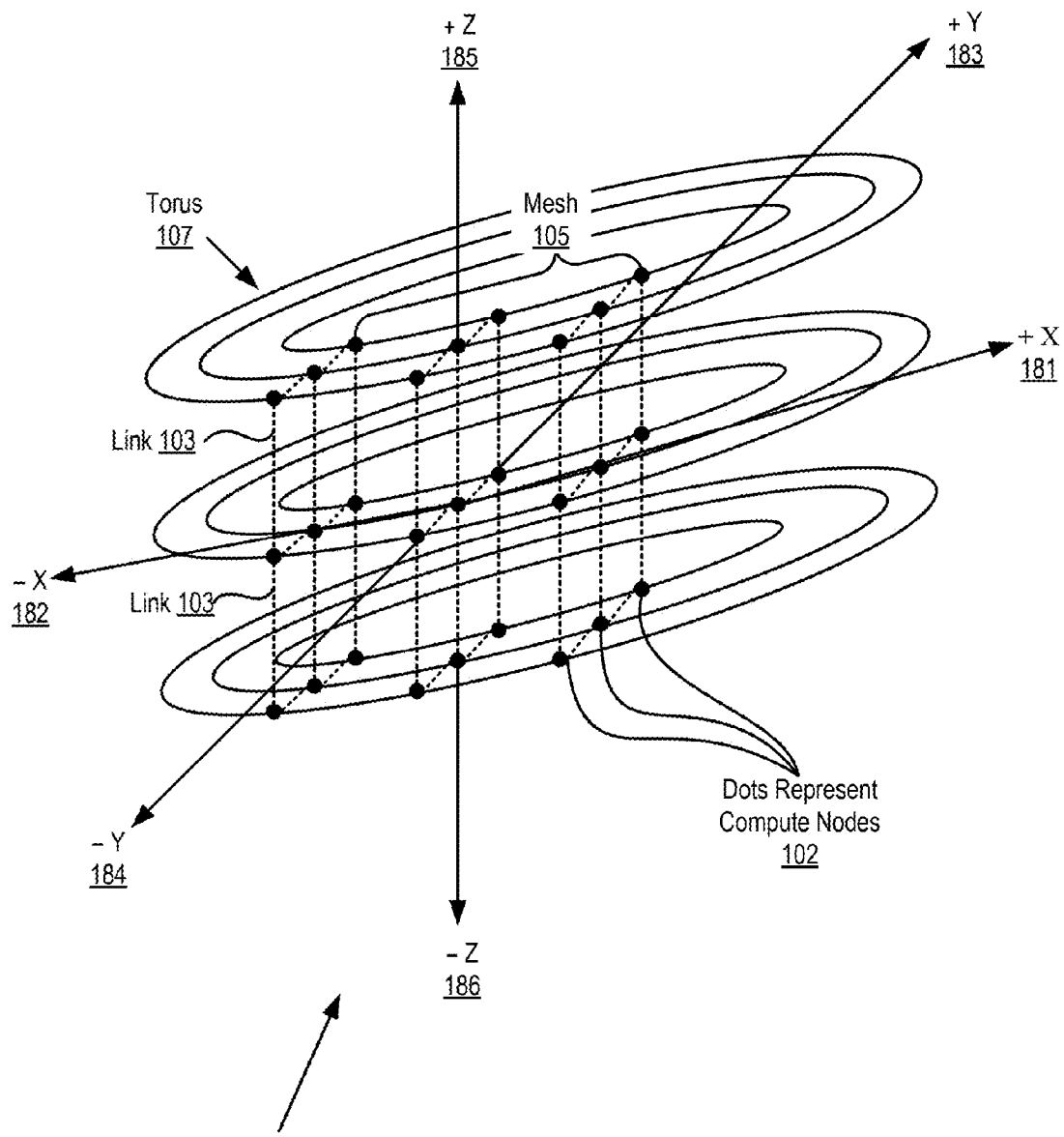
FIG. 4 sets forth a line drawing illustrating an example data communications network optimized for point-to-point operations useful in systems capable of developing collective operations for a parallel computer according to embodiments of the present invention.

For further explanation, FIG. 4 sets forth a line drawing illustrating an example data communications network (108) optimized for point-to-point operations useful in systems for which collective operations are developed in accordance with embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in a system for which collective operations are developed in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in a system for which collective operations are developed in accordance with embodiments of the present may in facet be implemented in two dimensions, four dimensions, five dimensions, and so on. Several supercomputers now use five dimensional mesh or torus networks, including, for example, IBM's Blue Gene Q™.

Figure 5:
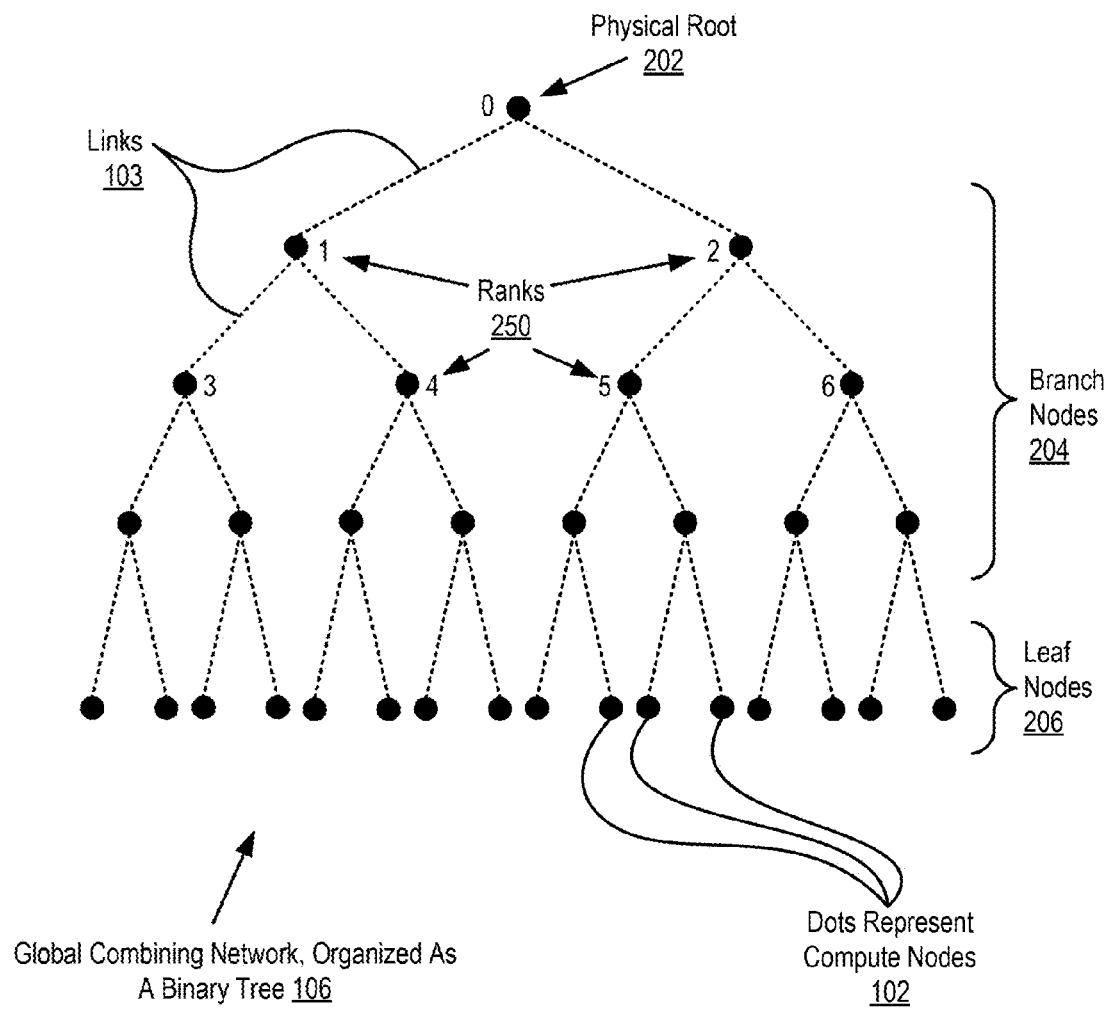
FIG. 5 sets forth a line drawing illustrating an example global combining network useful in systems capable of developing collective operations for a parallel computer according to embodiments of the present invention.

For further explanation, FIG. 5 sets forth a line drawing illustrating an example global combining network (106) useful in systems for which collective operations are developed in accordance with embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in systems for which collective operations are developed in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
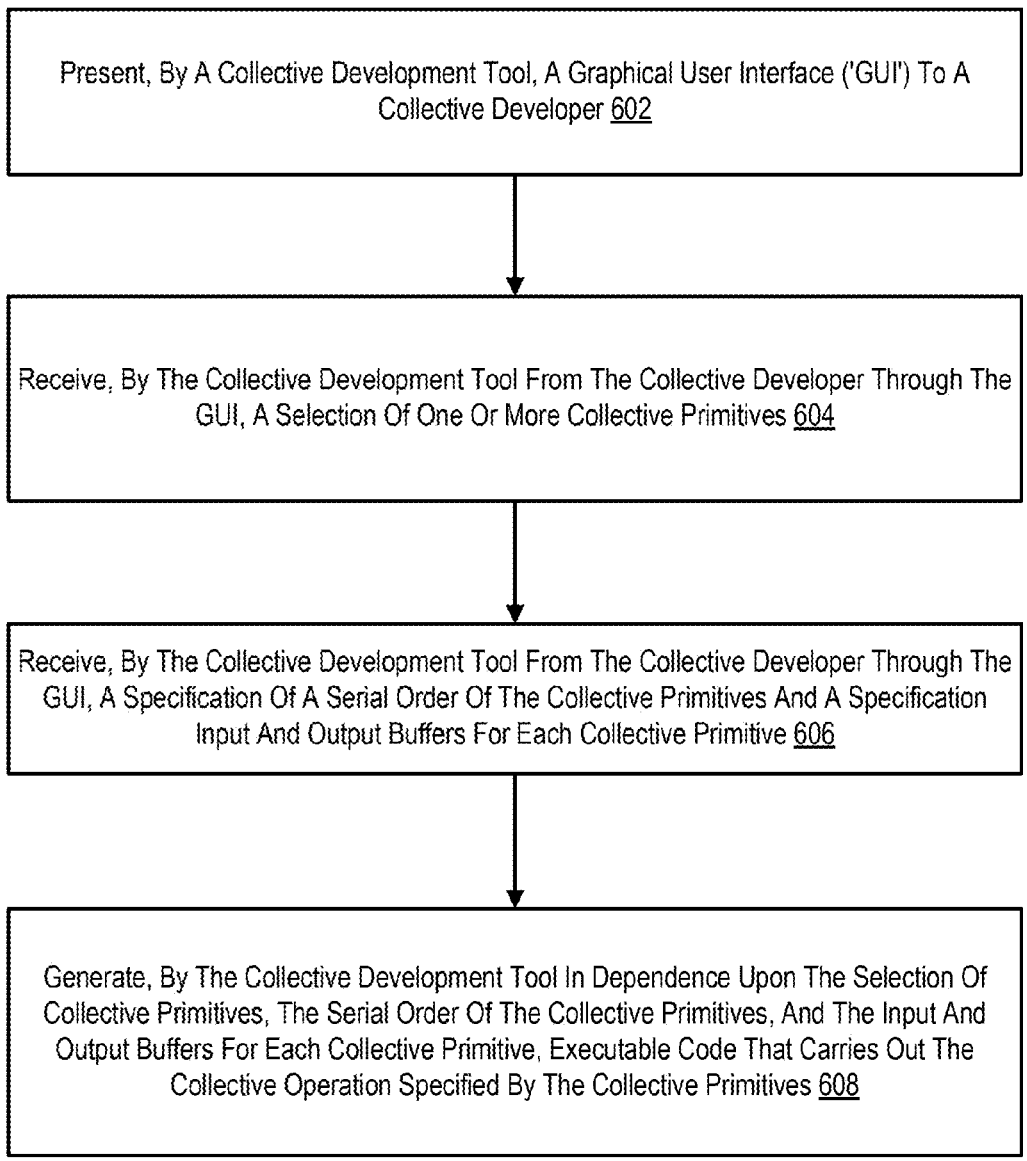
FIG. 6 sets forth a flow chart illustrating an example method for developing collective operations for a parallel computer according to embodiments of the present invention.

For further explanation, FIG. 6 sets forth a flow chart illustrating an example method developing collective operations for a parallel computer according to embodiments of the present invention. The parallel computer for which collective operations are developed in accordance with the method of FIG. 6 may include a plurality of compute nodes, similar to those set forth in the example of FIGS. 1 and 2.

The method of FIG. 6 includes presenting (602), by a collective development tool, a graphical user interface ('GUI') to a collective developer. The GUI presented to the collective developer may include many different GUI objects such as: graphical shapes representing collective primitives; graphical connectors for specifying a serial order among the collective primitives; drop down lists, text input fields, and the like for specifying size, type, and variable names of input and output buffers, and so on as will occur to readers of skill in the art. Presenting such a GUI may be carried out by displaying the GUI on a display screen, such as a monitor.

The method of FIG. 6 also includes receiving (604), by the collective development tool from the collective developer through the GUI, a selection of one or more collective primitives. Receiving (604) a selection of one or more collective primitives may be carried out in various ways, including, for example by detecting user input device activity that indicates a selection of one or more graphical icons related to the collective primitives, by receiving input from user input devices (as keyboard, mouse, and microphone, and the like), that drags-and-drops a GUI object representing a collective primitive, that invokes a selection of a primitive in a drop-down selection list, and so on as will occur to readers of skill in the art.

From the collective developer's perspective, a collective primitive includes an input, an operation, and an output. From the perspective of the collective development tool, a collective primitive is a module of computer program instructions, source code in some embodiments. Examples of such collective primitives include:

a multi-sync primitive that, when executed, carriers out synchronization among a plurality of compute nodes;

a multi-cast primitive that, when executed, sends a message to a group of nodes in parallel;
a multi-combine primitive that, when executed, performs an operation on data received from more than one compute node; and
a many-to-many primitive that, when executed, sends unique date to a group of compute nodes and receives data from another group of compute nodes.

The method of FIG. 6 also includes receiving (606), by the collective development tool from the collective developer through the GUI, a specification of a serial order of the collective primitives and a specification of input and output buffers for each collective primitive. Receiving (606) a specification of a serial order of the collective primitives may be carried out in various ways including, for example, by receiving input from user input devices that drags-and-drops a GUI connector between two GUI objects representing collective primitives, that inputs text in a text field specifying the order, that selects an order form a drop-down selection list, and in other ways as will occur to readers of skill in the art.

The method of FIG. 6 also includes receiving (606) a specification of input and output buffers for each collective primitive may be carried out by receiving input from user input devices that defines a size, a number of elements (or number of compute nodes), a variable name or pointer representing each buffer, and so on.

The method of FIG. 6 also includes generating (608), by the collective development tool in dependence upon the selection of collective primitives, the serial order of the collective primitives, and the input and output buffers for each collective primitive, executable code that carries out the collective operation specified by the collective primitives. Generating (608) executable code may be carried out by inserting in an executable file, modules of computer program instructions for each collective primitive (collective primitive modules') and, in accordance with predefined rules, insert 'glue modules' between the collective primitive modules. A 'glue module' as the term is used in this specification refers to a module of computer program instructions configured to be inserted between collective primitive modules for the purpose of linking the collective primitive modules during execution of the collective operation. Predefined rules that specify glue modules to be inserted between collective primitive modules may be based on many factors of the parallel computer upon which the collective operation is to be carried out. Different glue modules for example may be associated with different collective primitives, different network topologies, compute node architectures, number of compute nodes in an operational group, memory resources for communication adapters of compute nodes, and so on. In some embodiments, the collective development tool is configured with such parallel computer characteristics prior to collective operation development. In other embodiments, the collective developer may provide such parallel computer characteristics to the collective development tool while developing the collective operation.

The collective development tool may insert such glue modules between collective primitive modules automatically, without the collective developer's interaction. In this way, the collective operation may be produced without a collective developer composing any source code. The collective development tool therefore provides a collective developer with a tool to easily construct a collective operation, while also providing the collective developer means by which to specify, in fine detail, portions of the collective operation. Once the executable code is generated by the collective development tools, the code may be deployed on a parallel computer and executed.

Figure 7:
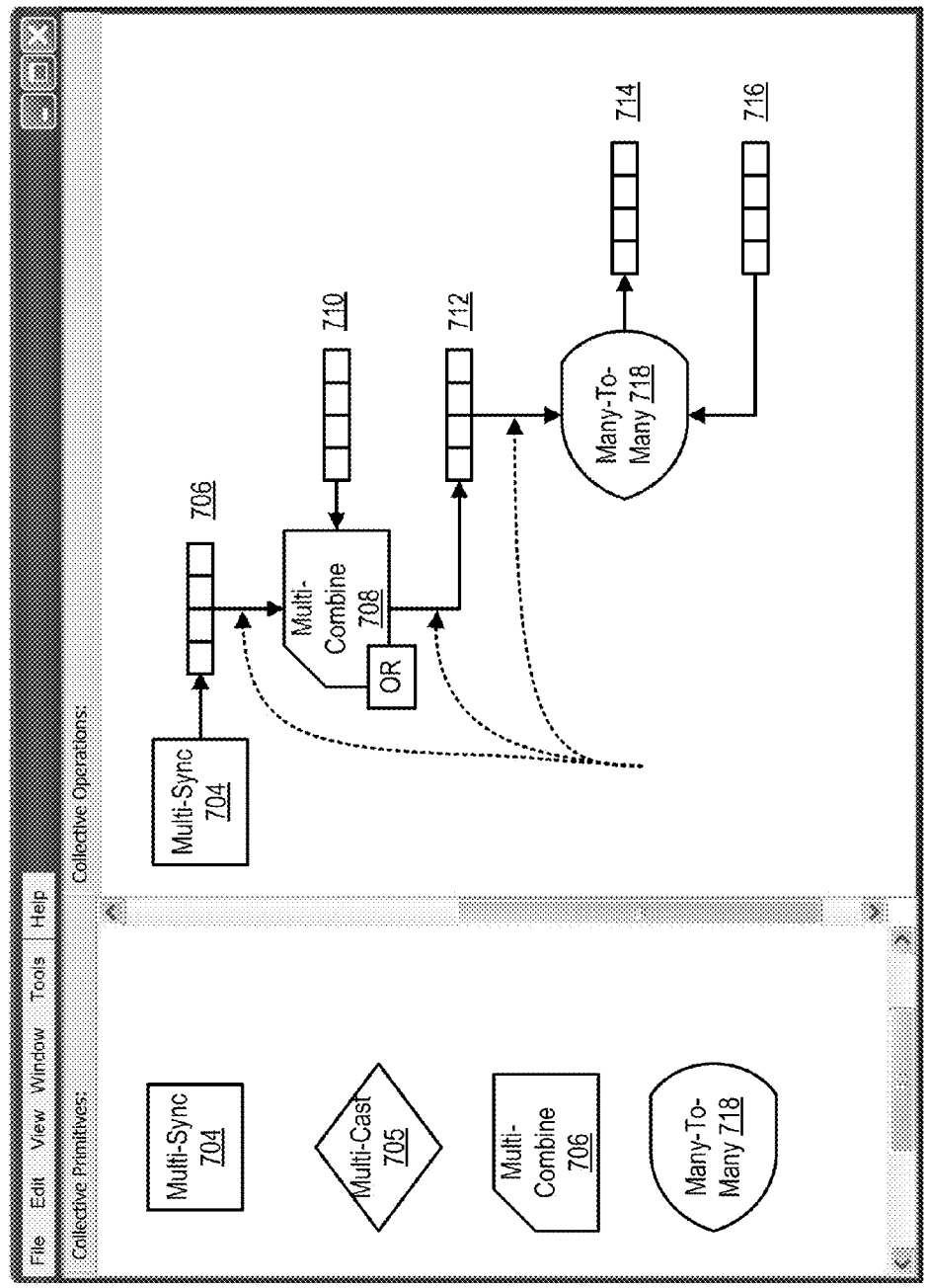
FIG. 7 sets forth a line drawing of an example graphical user interface presented by a collective development tool that supports developing collective operations for a parallel computer according to embodiments of the present invention.

FIG. 7 sets forth a line drawing of an example graphical user interface presented by a collective development tool that supports developing collective operations for a parallel computer according to embodiments of the present invention. The example GUI (702) of FIG. 7 includes two panes: a collective primitives pane and a collective operation pane. The collective primitives pane includes a graphical icon for each collective primitive available for selection by a collective developer (a user). In the example of FIG. 7, the collective primitives pane includes:
a graphical icon representing a multi-sync primitive (704) that, when executed, carriers out synchronization among a plurality of compute nodes;
a graphical icon representing a multi-cast primitive (705) that, when executed, sends a message to a group of nodes in parallel;
a graphical icon representing a multi-combine primitive (706) that, when executed, performs an operation on data received from more than one compute node; and
a graphical icon representing a many-to-many primitive (718) that, when executed, sends unique date to a group of compute nodes and receives data from another group of compute nodes.

Each of these graphical icons may be selected, dragged, and dropped into the collective operation pane in any combination and in any number. In this example, a collective developer has selected a multi-sync primitive (704), a multi-combine primitive (708) and a many-to-many primitive (718) for a collective operation by dragging the icons corresponding to each primitive to the collective operation pane. The collective developer has also specified an 'OR' operation to be effected while carrying out the multi-combine (708) primitive.

Once the collective developer selects the collective primitives that will form the collective operation, the collective developer may then specify a serial order of the collective primitives and input and output buffers for each selected collective primitive. In the example of FIG. 7, the collective developer has specified input buffers (706, 710, 712, 716) and output buffer (706, 712, 714). Some buffers may operate as an output buffer for one collective operation and an input buffer for another. A collective developer may also specify other characteristics of the buffers through text fields or other GUI objects configured to receive data entry such as a size, a type, a variable or pointer representing the buffer and so on.

The collective developer has also drawn, dragged, or otherwise provided user input to form arrows (720) between collective primitives and buffers in order to specify a serial order amongst the collective primitives. In this example, the serial order of the collective primitives begins with the multi-sync (704) primitive, continues with the multi-combine (708) primitive, and finishes with the many-to-many (718) primitive.

After a collective developer selects collective primitives, specifies an order of the primitives, and specifies input and output buffers of the collective primitives, the collective developer may initiate generate of executable code that will carry out the collective operation. A user may initiate such generation in various ways through the example GUI (702) of FIG. 7 including, invoking a GUI button designated for such generation, selecting an action from a drop down list or a menu list, entering a predefined set of keyboard keystrokes, and so on as will occur to readers of skill in the art.

In this way, a collective developer may efficiently and quickly create and generate executable code for a collective operation, while actually composing very little, if any, executable code. In addition to the ease and efficiency of collective development provided to a collective developer through the collective development tool of the present invention, the developer is also provided powerful means by which to specify characteristics of the collective operation in fine detail.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for developing collective operations for a parallel computer comprising a plurality of compute nodes, the apparatus comprising a computer processor, a computer memory operatively coupled to the computer processor, the computer memory having disposed within it computer program instructions that, when executed by the computer processor, cause the apparatus to carry out the steps of:

presenting, by a collective development tool, a graphical user interface ('GUI') to a collective developer;

receiving, by the collective development tool from the collective developer through the GUI, a selection of a plurality of collective primitives;

receiving, by the collective development tool from the collective developer through the GUI, a specification of a serial order of the collective primitives;

receiving, by the collective development tool from the collective developer through the GUI, a specification of an input buffer and an output buffer for each collective primitive; and wherein receiving, by the collective development tool from the collective developer through the GUI, the selection of the plurality of collective primitives further comprises:

detecting, by the collective development tool through the GUI, user input device activity that indicates a selection of one or more graphical icons related to the collective primitives;

generating, by a collective development tool in dependence upon the selection of the plurality of graphical icons related to collective primitives, the serial order of the plurality of collective primitives specifying an order of execution of the plurality of collective primitives, and the specification of an input buffer and an output buffer for each collective primitive, executable code that carries out the collective operation specified by the collective primitives, including:

converting the serial order of the collective primitives into an execution order of the plurality of collective primitive modules of computer program instructions;

inserting, into an executable file, the plurality of collective primitive modules of computer program instructions in the execution order; and inserting, into the executable file, one or more glue modules between the plurality of collective primitive modules, wherein each glue module is a module of computer program instructions configured to be inserted between two collective primitive modules for the purpose of linking the two collective primitive modules during execution of the collective operation, wherein each glue module is selected in dependence upon attributes of the parallel computer upon which the collective operation is to be carried out, including respective collective primitives, respective network topologies, compute node architecture, and number of compute nodes in a computational group.

2. The apparatus of claim 1 wherein at least one collective primitive comprises:

a multi-sync primitive that, when executed, carries out synchronization among a plurality of compute nodes.

3. The apparatus of claim 1 wherein at least one collective primitive comprises:

a multi-cast primitive that, when executed, sends a message to a group of nodes in parallel.

4. The apparatus of claim 1 wherein at least one collective primitive comprises:

a multi-combine primitive that, when executed, performs an operation on data received from more than one compute node.

5. The apparatus of claim 1 wherein at least one collective primitive comprises:

a many-to-many primitive that, when executed, sends unique date to a group of compute nodes and receives data from another group of compute nodes.

6. A computer program product for developing collective operations for a parallel computer comprising a plurality of compute nodes, the computer program product disposed upon a computer readable storage medium, wherein the computer program product is not a signal, the computer program product comprising computer program instructions that, when executed, cause a computer to carry out the steps of:

presenting, by a collective development tool, a graphical user interface ('GUI') to a collective developer;

receiving, by the collective development tool from the collective developer through the GUI, a selection of a plurality of collective primitives;

receiving, by the collective development tool from the collective developer through the GUI, a specification of a serial order of the collective primitives;

receiving, by the collective development tool from the collective developer through the GUI, a specification of an input buffer and an output buffer for each collective primitive; and wherein receiving, by the collective development tool from the collective developer through the GUI, the selection of the plurality of collective primitives further comprises:

detecting, by the collective development tool through the GUI, user input device activity that indicates a selection of one or more graphical icons related to the collective primitives;

generating, by a collective development tool in dependence upon the selection of the plurality of graphical icons related to collective primitives, the serial order of the plurality of collective primitives specifying an order of execution of the plurality of collective primitives, and the specification of an input buffer and an output buffer for each collective primitive, executable code that carries out the collective operation specified by the collective primitives, including:

converting the serial order of the collective primitives into an execution order of the plurality of collective primitive modules of computer program instructions;

inserting, into an executable file, the plurality of collective primitive modules of computer program instructions in the execution order; and inserting, into the executable file, one or more glue modules between the plurality of collective primitive modules, wherein each glue module is a module of computer program instructions configured to be inserted between two collective primitive modules for the purpose of linking the two collective primitive modules during execution of the collective operation, wherein each glue module is selected in dependence upon attributes of the parallel computer upon which the collective operation is to be carried out, including respective collective primitives, respective network topologies, compute node architecture, and number of compute nodes in a computational group.

7. The computer program product of claim 6 wherein at least one collective primitive comprises:
   a multi-sync primitive that, when executed, carries out synchronization among a plurality of compute nodes.

8. The computer program product of claim 6 wherein at least one collective primitive comprises:
   a multi-cast primitive that, when executed, sends a message to a group of nodes in parallel.

9. The computer program product of claim 6 wherein at least one collective primitive comprises:
   a multi-combine primitive that, when executed, performs and operation on data received from more than one compute node.

10. The computer program product of claim 6 wherein at least one collective primitive comprises:
    a many-to-many primitive that, when executed, sends unique date to a group of compute nodes an receives data from another group of compute nodes.

\* \* \* \* \*